United States Patent [19]

Reng

[11] Patent Number: 5,442,265
[45] Date of Patent: Aug. 15, 1995

[54] METHOD AND APPARATUS FOR IMPROVING THE RUNNING CHARACTERISTICS OF A WHEEL BLOCK BOGIE

[75] Inventor: Leonhard Reng, Herzogenaurach, Germany

[73] Assignee: Siemens Aktiengesellschaft, Munich, Germany

[21] Appl. No.: 129,220

[22] Filed: Sep. 29, 1993

[30] Foreign Application Priority Data

Sep. 29, 1992 [EP] European Pat. Off. ............ 92116655

[51] Int. Cl.$^6$ .............................................. B61F 5/38
[52] U.S. Cl. ........................................ 318/77; 318/52; 318/66
[58] Field of Search ................ 318/52, 66, 77, 433, 318/51, 91, 135

[56] References Cited

U.S. PATENT DOCUMENTS

| | | | |
|---|---|---|---|
| 4,037,143 | 7/1977 | Söderberg | 318/52 |
| 4,087,725 | 5/1978 | Burn | 318/52 |
| 4,644,232 | 2/1987 | Nojiri et al. | 318/66 |
| 5,117,136 | 5/1992 | Kobayashi et al. | 318/135 |

FOREIGN PATENT DOCUMENTS

| | | |
|---|---|---|
| 374290 | 4/1992 | European Pat. Off. |
| 3345260 | 6/1985 | Germany |

OTHER PUBLICATIONS

ZEV-Glas. Ann. 114 (1990) No. 1/1 Jan./Feb., pp. 24–29: *Aspekte zur Spurführung*.

Primary Examiner—John W. Cabeca
Attorney, Agent, or Firm—Kenyon & Kenyon

[57] ABSTRACT

A rail vehicle may be provided with a plurality of individual wheels (11, 12, 21, 22) and traction motors which are supplied with power on a wheel block by wheel block basis by means two control devices each including open loop and closed loop controls (6, 8). The wheel speeds (n11, n12, n21, n22) are used to determine two wheel block speeds (n1, n2), from which an actual speed difference value ($\Delta n$) is calculated. A manipulated variable ($\Delta m^*$) is produced from a comparison of the actual speed differences value ($\Delta n$) to a set speed difference value ($\Delta n^*$). A set traction lever value ($m$,) is increased and reduced by this manipulated variable ($\Delta m$). Consequently, the wheel blocks (1, 2) obtain a definitively set speed difference corresponding to the arc radius (r), whereby the running behavior on bends is significantly improved by virtue of the satisfied rolling condition.

6 Claims, 3 Drawing Sheets

METHOD AND APPARATUS FOR IMPROVING THE RUNNING CHARACTERISTICS OF A WHEEL BLOCK BOGIE

BACKGROUND OF THE INVENTION

The present invention relates to a method and an apparatus for improving the running characteristics of a running gear of a rail vehicle which is provided with a plurality of individual wheels and the traction motors of which are supplied with power on a wheel block by wheel block basis by two open-loop/closed-loop control devices.

Rail vehicles comprise car body and running gear. The running gear has two tasks: it assumes the guidance of the vehicle in the gage channel of the track, and it has to protect the car body against impacts.

Track guidance is ideal if the vehicle exactly follows the center of the track. The track guidance behavior of the running gear better approximates ideal track guidance the quicker deviations from the track axis are corrected.

The track guidance behavior can be quickly assessed on the basis of just two parameters:
the reduction of transverse offset and
the reduction of tilting in the track.

Transverse displacements are related to forces while the reduction of tilting relates to a turning moment. The latter in turn is related to forces, which produce the desired moment by a lever arm about a suitable pivot point or as a force couple.

In a wheel/rail contact surface forces occur which can be used for guiding. Depending on the physical effect, a distinction is to be drawn between two fundamentally different types of forces.

When the wheel slides transversely there is a first frictional force at the stand-up point of the wheel in relation to the rail. When the wheel slides longitudinally also at the stand-up point of the wheel in relation to the rail there is a second frictional force. The product of relative speed and frictional force constitutes a frictional power loss. It is manifested as a resistance to track guidance and is converted in wheel-rail contact into heat and wear on the wheel and rail. Rolling noise is also closely associated with it.

In the article "Aspekte zur Spurführung" (Aspects of track guidance), printed in the journal "ZEV-Glas-.Ann." 114 (1990), No. ½, pages 24 to 29, various track guidance principles are presented and investigated with regard to track guidance behavior.

This article discloses a "wheel block" track guidance principle. In the case of a wheel block, two individual wheels are used, which are not arranged next to each other but one behind the other. The individual wheels arranged one behind the other prove to be virtually ideal for the correction of tilting. Traverse frictional forces of the same magnitude act on the two wheels of the inclined wheel block due to the same tilted running angle δ. With respect to the pivot point, they compensate for the turning moments occurring as a result. From this aspect, the wheel block is always in a state of equilibrium. From any desired position of the phase diagram of the wheel block, the transverse deflections and any tilting are reduced very quickly to values around zero. The wheel block reduces both the transverse offset and tiltings and consequently reduce wear by means of profile lateral forces. The wheel block track guidance principle would come very close to the ideal if there were no longitudinal frictional forces, as is the case with driven wheels.

EP 0 374 290 A1 discloses a rail vehicle which comprises on both sides along the longitudinal vehicle axis a predeterminable number of individual wheels which can be swiveled by steering. Track-error-free steering of each individual wheel in all bend regions is achieved by providing a rail-path measuring device, which measures the deviation of a vehicle axis from the path of the rail and which, depending on the measured deviations, generates a steering signal for each individual wheel independently of the other. Consequently, in any position on a bend, each individual wheel is always correctly steered in such a way that track errors can no longer occur.

The above-mentioned article also discloses the "wheelset" track guidance principle. Wheelsets have two wheels, which are fixedly connected to the wheelset shaft. This necessarily causes the wheels to rotate with the same rotational speed. In addition, the two wheels inevitably experience the same tilting with respect to the track if the wheelset is turned about a vertical axis. A transverse offset directly initiates a likewise undesired tilting owing to longitudinal frictional forces occurring. Just as a transverse deflection leads to tilting, conversely tilting results in a transverse deflection. The two movements are closely linked to one another. They alter as a function of each other in a constant state of change. Once deflected, the wheelset no longer comes to rest. As known, a wheelset moves in a wave form in the gage channel (sinusoidal motion), striking against the wheel flange being unlikely on straight sections of track.

When traveling around bends, in an ideal case the wheel planes should be tangential to the rail. Nevertheless, rolling of the wheels without any constraining forces is guaranteed only if the rolling radii of the wheels are relatively equal to the arc lengths of the two running rails. This permits a transverse offset. The necessary difference between the rolling radii on account of the angle of taper or conicity of the wheel profiles of the two wheels becomes the known rolling condition of the wheelset. If, owing to the track guidance, the necessary difference between the rolling radii is greater than the possible difference on account of the wheel profile, the wheels can no longer roll without any constraining forces. In other words the wheel on the outside of the bend therefore turns too slowly, the wheel on the inside of the bend turns too quickly. Due to the different longitudinal frictional forces, there occurs with respect to the vertical axis a turning moment, which turns the running gear, also known as the bogie, out from the arc. The counter-moment can be applied only by the transverse frictional forces or by a striking of the wheel flange, with corresponding wear.

A bogie with rigid axle behavior displays good running characteristics on straight sections (classical sinusoidal motion), but constant striking may not be prevented on curved sections if the rolling condition is no longer satisfied owing to too small an arc radius.

SUMMARY OF THE INVENTION

The present invention provides a method and an apparatus for improving the running characteristics of a wheel block bogie.

According to an embodiment of the present invention the speed of each of a plurality of individual wheels is detected; the detected speeds are used to calculate wheel block speeds; an actual speed difference is calculated from the calculated wheel block speeds; the actual speed difference is compared to a predetermined set speed difference to produce a manipulated variable; and set torque values are provided to each of two open loop/closed loop control devices based on the manipulated variable and a set traction level value.

By respectively combining, according to the invention, the wheel speeds of the individual wheels of each wheel block to form an actual speed difference value, a statement is obtained as to the actual instantaneous difference in speed between a left-hand wheel block and a right-hand wheel block. This actual speed difference value is compared with a predetermined set speed difference value, which gives a speed difference matching the bend radius. From the system deviation between set speed difference value and actual speed difference value, a manipulated variable is generated, which is added to or subtracted from a set traction lever value, so that the desired speed difference establishes itself. This yields a set value for the open-loop and closed-loop control device of each wheel block of the running gear, by which the rolling condition is satisfied when traveling around bends of any arc radius, thereby improving significantly the running characteristics of this running gear in comparison with a rigid axle for traveling around bends.

Consequently, good track guidance behavior of a rigid axle on a straight track is also ensured when traveling around bends by a suitable speed difference control.

An apparatus according to the invention is defined by: at least one adder for each wheel block wherein each adder determines a wheel block speed from the detected speeds of the individual wheels of the wheel block; a comparator having its inputs linked to outputs of the adder associated with each wheel block; a constant element multiplier connected to an output of said comparator and producing said actual speed difference; a second comparator receiving a set speed difference value at the positive input, receiving said actual speed difference at a negative input and providing as an output the difference of the inputs; a controller receiving said output of said second comparator and producing the manipulated variable; a second adder having at a first input the set traction lever value and a second input receiving the manipulated variable and providing an output to the first open-loop and closed-loop control device of the running gear; and a subtractor having at a first input the set traction lever value and a second input receiving the manipulated variable and providing an output to the first open-loop/closed-loop control device of the running gear. This apparatus makes the setup very simple and inexpensive.

In the case of a further embodiment of the apparatus, the set speed difference value is determined as a function of a determined angle, of the measured wheel speeds and of the number of individual wheels of the bogie. As a result, the set speed difference value is in each case calculated to match the curve radius according to the rolling condition.

In the case of an advantageous embodiment of the apparatus for carrying out the method according to the present invention, the superimposed speed difference control with the calculation of the set speed difference value comprises a microcomputer, it even being possible for this microcomputer to be a component part of a higher-level vehicle control.

BRIEF DESCRIPTION OF THE DRAWINGS

For further explanation of the method according to the invention for improving the running characteristics of a running gear provided with a plurality of individual wheels, reference is made to the drawings, in which a plurality of embodiments are illustrated.

DETAILED DESCRIPTION

Figure 1:
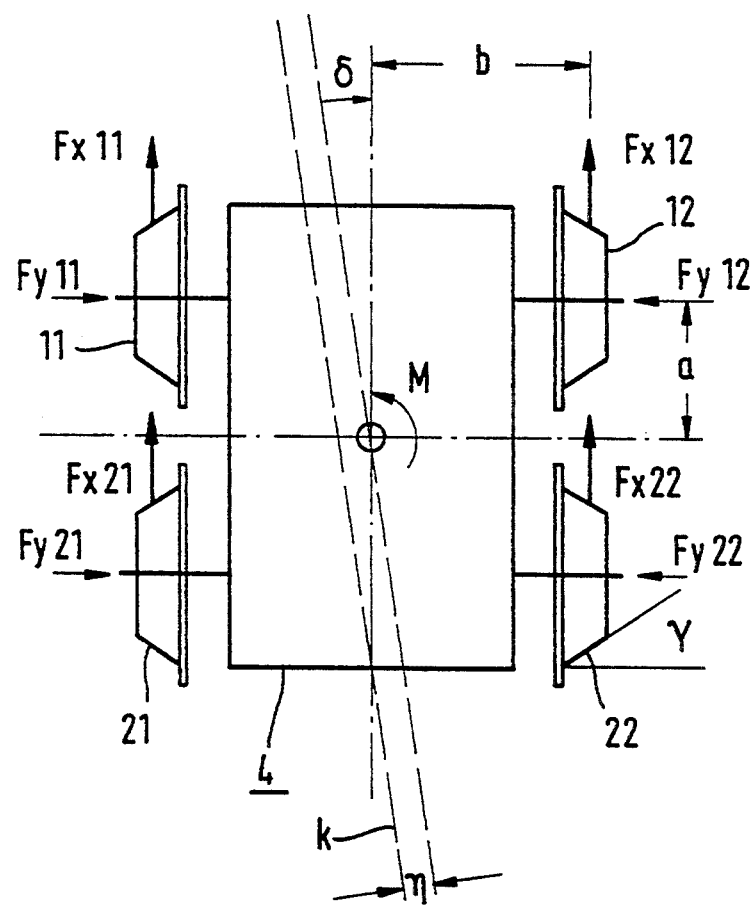
FIG. 1 shows a bogie with adjusting moment, longitudinal frictional forces and the transverse forces.

A diagram of a bogie 4 shown in FIG. 1 serves to explain the forces acting on the bogie 4 and lever arms. This bogie 4 is not equipped with two conventional wheelsets (rigid axles), but with four individual wheels 11, 12, 21 and 22. Each individual wheel 11, 12, 21 and 22 is driven by a motor via a transmission, the transmission and the motor not being shown for reasons of clarity. The position of the bogie 4 on the track is dictated by the adjusting moment M. This moment, which is defined with reference to the vertical axis through the pivot pin, becomes:

$$M = (Fx12 + Fx22 - Fx11 - Fx21)b + (Fy12 + Fy21 - Fy11 - Fy22)a,$$

where
Fx are longitudinal frictional forces (driving force);
Fy are transverse forces;
b is half the spacing of the wheel stand-up points;
a is half the axle spacing;
R is the rolling radius;
M is the adjusting moment about the vertical axis;
$\eta$ is the transverse offset;
$\delta$ is the angle of tilt;
$\gamma$ is the angle of inclination of the wheel profile.

The transverse forces Fyij are dependent on the proportion of weight of the vehicle to be taken up by the wheel, the angle of inclination of the wheel profile at the respective stand-up point, the angular position of the bogie with respect to the longitudinal track axis and the wheel/rail sliding angle. Upon transverse displacement of the wheelset on the track, the transverse forces alter essentially only if the angle of inclination of the wheel profile alters. However, given the proposed wheel profile, this angle is constant in the possible running region. As a result, the transverse forces remain constant and are of equal magnitude on all wheels as long as no striking against the wheel flange occurs. Consequently, the transverse forces cancel one another out in the specified moment equation.

The longitudinal frictional forces Fxij are the driving forces of the vehicle and may be affected actively via an open-loop control device. For further consideration, the simplified calculation equation for the adjusting moment suffices:

$$M = b(Fx12 + Fx22 - Fx11 - Fx21).$$

The respective force Fxij is positive if the circumferential wheel speed at the wheel stand-up point is greater than the vehicle speed. Correspondingly, the force becomes zero at constant speed or negative if the circumferential wheel speed is less than the vehicle speed. Longitudinal frictional forces are therefore always to be regarded in connection with a wheel/rail slip.

If the bogie 4, and consequently the wheels 11, 12, 21 and 22, moves at an angle $\delta$ obliquely with respect to the wheel plane, it slides with a transverse slip in relation to the rail. The relative movement is opposed by a lateral frictional force Fy, induced by the frictional wheel/rail contact. This leads to an undesired friction effect, which is converted into heat, wear and noise. The tilting may even lead to striking of the wheel flange and is prevented only by virtue of the fact that, with the bogie 4 deflected obliquely about the vertical axis, there is produced a turning moment M which effects a return movement into a position parallel to the direction of travel, or parallel to the track, i.e., the tilting $\delta$ again becomes zero.

A transverse offset $\eta$ alone produces neither wear nor noises and is therefore without any track guiding disadvantages. On account of the angle of taper or conicity of the wheel profiles, however, there are different rolling radii and, depending on the drive concept chosen, there arise differences in the longitudinal frictional forces, whereby a turning moment M occurs.

Let it now be assumed that this bogie 4 comprises a front wheelset, comprising the individual wheels 11 and 12, and a rear wheelset, comprising the individual wheels 21 and 22, the motors of one wheelset respectively being connected in parallel and receiving the same supply voltage and supply frequency.

Upon a transverse displacement $\eta$ of the wheelset, owing to the wheel profile, the wheel diameters alter at the points of wheel/rail contact. The wheel diameter increases from the outer wheel side toward the wheel flange. The wheel diameter is therefore greater at the running-on wheel, e.g., 11, and less at the running-off wheel, e.g., 12, than the nominal diameter. Owing to the approximately equal speed of the two wheels, different relative speeds between wheels and rails result. The driving force of the running-on wheel increases, that of the running-off wheel decreases.

With an assumed transverse offset $\eta$ to the right, with reference to the track center line k according to FIG. 1, the right-hand longitudinal frictional forces Fx12 and Fx22 are greater than the left-hand longitudinal frictional forces Fx11 and Fx21, so that a turning moment M about the vertical axis of the bogie 4 is produced. The bogie 4 tilts about the angle $\delta$ (negative) obliquely to the direction of movement. Thus, a transverse offset $\eta$ directly initiates an undesired tilting $\delta$. Just as before a transverse deflection to the right led to a tilting $\delta$, conversely the tilting $\delta$ results in a transverse deflection $\eta$ to the left. The two movements are linked to each other. They alter in a continuous state of change. Once deflected, the wheelset does not quickly come to rest. Such a bogie 4 with rigid axle behavior moves in wave form in the gage channel (sinusoidal motion), striking against the wheel flange being unlikely on straight sections of track.

When traveling around bends, when the rolling condition is no longer satisfied owing to too small an arc radius, constant striking cannot be prevented. In addition to this, unallowably high differences in torque between the parallel-connected traction motors occur.

Figure 2:
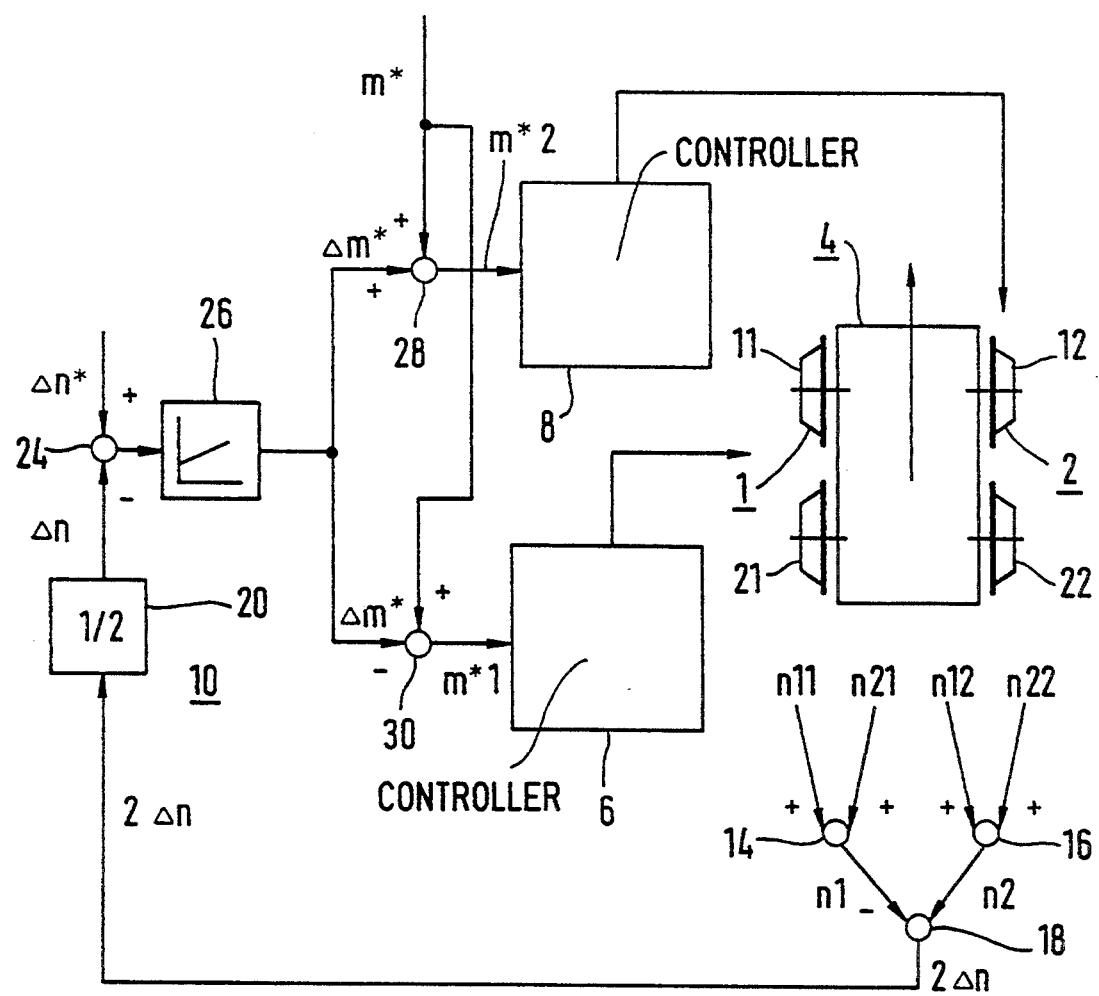
FIG. 2 illustrates a block diagram of a speed difference control according to an embodiment of the present invention.

FIG. 2 is a block diagram of an apparatus for carrying out a method according to an embodiment of the present invention for improving the running characteristics of a running gear 4 which is provided with a plurality of individual wheels 11, 12, 21 and 22 and is also referred to as a bogie. Each individual wheel 11, 12, 21 and 22 is assigned a traction motor, which are not shown in any more detail for reasons of clarity. In the case of this running gear 4, the individual wheels 11, 12, 21 and 22 are supplied with power wheel block by wheel block. For this purpose, the traction motors of the individual wheels 11 and 21 are supplied by a first actuator, for example a converter, in particular a pulse converter, and the traction motors of the individual wheels 12 and 22 are supplied by a second actuator, for example a converter, in particular a pulse converter. These actuators are also not shown in any more detail for reasons of clarity. Consequently, the possibility exists of operating the left-hand wheel block 1 at a different torque and speed than the right-hand wheel block 2, which is of advantage in particular for traveling around bends without any constraining forces.

The driving moments m*1 and m*2 of the left-hand and right-hand motors are set to be of approximately the same magnitude with the aid of two open-loop and closed-loop control devices 6 and 8. If the same motor torques m*1 and m*2 are imposed exactly on both sides of the bogie 4 by means of these two open-loop and closed-loop control devices 6 and 8, under the theoretical assumption of identical rolling radii on all four wheels 11, 12, 21 and 22 it may be expected that the bogie 4 would run in a straight line.

However, owing to the conicity of the wheel profiles, a slight transverse offset $\eta$ leads to different rolling radii, and consequently to different longitudinal frictional forces Fxij.

With an assumed transverse offset $\eta$ of the bogie 4 to the left, there is a greater rolling radius for the left-hand wheels 11 and 21. The closed-loop control ensures that the moments m*1 and m*2 remain equal. With different effective radii and equal moments, different driving forces are obtained. If, as in this example, the effective radius on the left side is greater, the driving force on the left, i.e., the longitudinal frictional forces Fx11 and Fx21, must be less, owing to the equality of the moments. Due to the positive torque, the wheel flange of the left-hand front wheel is pressed against the rail and that of the left-hand rear wheel is pressed away from the rail. The bogie 4 becomes tilted. The bogie 4 can no longer free itself from this tilting. Even if the motor torques m*1 and m*2 are exactly equal, striking of the wheels 11, 12, 21 and 22 inevitably occurs.

If the rolling movement defined for the rigid axle is modified by making not the rolling radii but the speeds of the wheels proportional to the arc lengths the determining parameter, a difference between the wheel speeds is obtained as:

$$\Delta n^*/n = 2b/r \text{ (rolling condition)},$$

wherein
r = arc radius
2b = track width
n = running gear
$\Delta n^*$ = set speed difference value.

A speed difference control 10, superimposed on the torque control, ensures a speed difference $\Delta n^*$ respectively matching a bend radius r, according to the rolling condition.

This superimposed speed difference control 10 comprises on the input side two adders 14 and 16, which are linked on the output side to a first comparator 18. The adder 14 adds the wheel speeds n11 and n21 of the left-hand wheel block 1 to form a wheel block speed n1 and the adder 16 adds the wheel speeds n12 and n22 of the right-hand wheel block 2 to form a wheel block speed n2. The first comparator 18 forms an actual speed difference value $2\Delta n = n2 - n1$. The output of the first comparator 18 is provided to the input side of a constant element 20, which multiplies the determined actual speed difference value by ½. The actual speed difference value $\Delta n$ of the bogie 4 is the output of the constant element 20. This actual value $\Delta n$ is compared by means of a second comparator 24 with a predetermined set speed difference value $\Delta n^*$ and a manipulated variable $\Delta m^*$ is produced from the existing system deviation by means of a controller 26. This manipulated variable $\Delta m^*$ is fed to an adder 28 and to a subtractor 30, at the first inputs of which there is a set traction lever value $m$,, also referred to as a set torque value. The output of the adder 28 is connected to the open-loop and closed-loop control device 8 for the actuator of the motors of the individual wheels 12 and 22 of the right-hand wheel block 2 and the output of the subtractor 30 is connected to the open-loop and closed-loop control device 6 for the actuator of the motors of the individual wheels 11 and 21 of the left-hand wheel block 1. At the output of the adder 28 and of the subtractor 30 there is a set torque value $m^*2$ and $m^*1$, respectively, so that, for example, the speed n2 of the right-hand wheel block 2 increases as a function of a bend radius r and the speed n1 of the left-hand wheel block 1 decreases to the same extent.

When traveling around bends, a speed difference value $\Delta n$ corresponding to a known bend radius r is set on the control. The two wheel blocks 1 and 2 of the bogie 4 obtain a definitively set speed difference corresponding to the arc radius r, that is likewise a fixed speed coupling with $\Delta n^*$ not equal to zero. Consequently, the rolling condition is satisfied with any arc radius. The running behavior on bends is consequently better than in the case of rigid axles by virtue of the satisfied rolling condition.

When traveling straight ahead, $\Delta n^* = 0$. The speed difference control 10 in this case ensures equal speeds n1 and n2 of the two wheel blocks 1 and 2 of the bogie 4.

Figure 3:
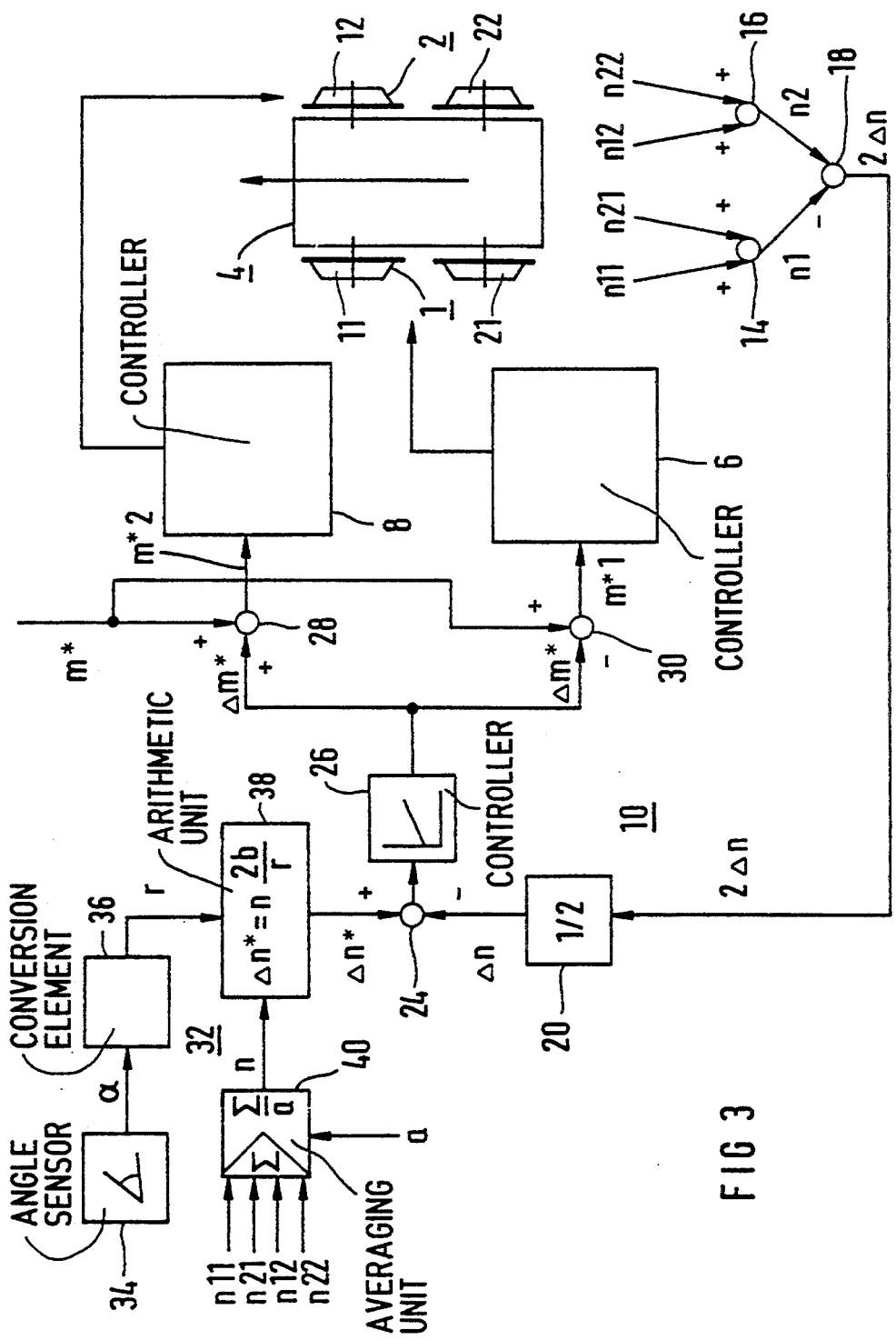
FIG. 3 illustrates a block diagram of an advantageous speed difference control according to a second embodiment of the present invention.

FIG. 3 shows a block diagram of an advantageous embodiment of the apparatus according to FIG. 2. The difference from the apparatus of FIG. 2 is that, in the case of this apparatus, a circuit arrangement 32 for determining the set speed difference value $\Delta n^*$ is indicated. This circuit arrangement 32 comprises a joint angle sensor 34, which is followed in series by a conversion element 36. On the output side, this conversion element 36 is linked to an arithmetic unit 38, the second input of which is linked to an averaging unit 40. On the output side, this arithmetic unit 38 is connected to the positive input of the second comparator 24. The first inputs of the averaging unit 40 receive the determined wheel speeds n11, n12, n21 and n22 and the second input receives the numerical value of the number "a" of individual wheels 11, 12, 21 and 22 of the running gear 4. This averaging unit 40 adds the applicable wheel speeds n11, n12, n21 and n22 and divides this sum by the number "a" of individual wheels 11, 12, 21 and 22 of the running gear 4, so that there is an average running gear speed n at the output. The joint angle $\alpha$, which is determined by means of the joint angle sensor 34, is converted, with the aid of the conversion element 36, into an arc radius r. In the arithmetic unit 38, the mentioned rolling condition, which is resolved for the set speed difference value $\Delta n^*$, is stored. As a function of the arc radius r of the bend traveled through and of the average running gear speed n, the associated set speed difference value $\Delta n^*$ is determined. By means of the superimposed speed difference control 10, the two wheel blocks 1 and 2 of the bogie 4 obtain a definitively set speed difference corresponding to the arc radius r.

By virtue of this superimposed speed difference control 10, the rolling condition is always satisfied when traveling around bends, thereby significantly improving the striking behavior of the running gear 4 on bends. Consequently, the wear of the wheel and of the rail is reduced and the running characteristics of the running gear 4 improve considerably.

The method described may also be applied in the case of rail vehicles with pairs of wheels (that is to say without bogie).

What is claimed is:

1. In a rail vehicle having a plurality of individual wheels arranged in two wheel blocks and a plurality of traction motors wherein the motors are supplied with power on each wheel block by wheel block basis, said two wheel blocks are controlled by a first and a second open loop/closed loop control device, a method comprising the steps of:
   detecting the speed of the plurality of individual wheels;
   for each wheel block calculating a wheel block speed based on the detected speed of the individual wheels of the associated wheel block;
   detecting an actual speed difference from the calculated wheel block speeds;
   comparing said actual speed difference to a predetermined set speed difference value, and producing a manipulated variable from the comparison;
   providing a set torque value to the first open loop/closed loop control device, said set torque value formed by subtracting said manipulated variable from a set traction level value; and
   providing a set torque value to the second open loop/closed loop control device, said set torque value formed by adding said manipulated value a set traction level value.

2. The method of claim 1, wherein said set speed difference value is determined as a function of a determined arc radius and of a running gear speed according to the following rolling condition:

$$\Delta n^*/n = 2b/r$$

wherein
   2b = track gage
   r = arc radius
   n = running gear speed
   $\Delta n^*$ = set speed difference value.

3. The method of claim 2, wherein the running gear speed is determined by the steps of summing the detected speeds of said plurality of individual wheels and dividing that sum by the number of said plurality of individual wheels.

4. An apparatus for carrying out the method as claimed in claim 1, comprising:
   at least one adder for each wheel block wherein each adder determines a wheel block speed from the detected speeds of the individual wheels of the wheel block;

a comparator having its inputs linked to outputs of the adder associated with each wheel block;

a constant element multiplier connected to an output of said comparator and producing said actual speed difference;

a second comparator receiving the predetermined set speed difference value at a positive input, receiving said actual speed difference at a negative input and providing as an output the difference of the inputs;

a controller receiving said output of said second comparator and producing the manipulated variable;

a second adder having at a first input the set traction lever value and a second input receiving the manipulated variable and providing an output to the second open-loop/closed-loop control device of the running gear; and a subtractor having at a first input the set traction lever value and a second input receiving the manipulated variable and providing an output to the first open loop/closed loop control device of the running gear.

5. The apparatus of claim 4 further comprising:
an angle sensor detecting a joint angle;
a converter converting said detected joint angle into an arc radius;
an averaging unit calculating an average wheel speed; and
an arithmetic unit receiving said arc radius and said average wheel speed and creating the set speed difference value.

6. The apparatus of claim 5 wherein said averaging unit receives as inputs the speed of each of said plurality of wheels and the number of said plurality of wheels.

* * * * *